US012500751B2

(12) United States Patent
Balaji et al.

(10) Patent No.: US 12,500,751 B2
(45) Date of Patent: Dec. 16, 2025

(54) SYSTEM AND METHOD OF ASSIGNING GEOSPATIAL DATA TO TOKENIZED RESOURCES VIA A BRIDGE PROTOCOL

(71) Applicant: BANK OF AMERICA CORPORATION, Charlotte, NC (US)

(72) Inventors: Sujatha Balaji, Tamil Nadu (IN); Rajapandian Chellimuthu, Tamil Nadu (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 367 days.

(21) Appl. No.: 17/750,478

(22) Filed: May 23, 2022

(65) Prior Publication Data
US 2023/0379149 A1 Nov. 23, 2023

(51) Int. Cl.
H04L 9/08 (2006.01)
H04L 9/32 (2006.01)
H04L 41/16 (2022.01)

(52) U.S. Cl.
CPC .......... H04L 9/0872 (2013.01); H04L 9/3213 (2013.01); H04L 41/16 (2013.01)

(58) Field of Classification Search
CPC ..... H04L 9/0872; H04L 9/3213; H04L 41/16; H04L 9/50
See application file for complete search history.

(56) References Cited

U.S. PATENT DOCUMENTS

| 11,075,891 | B1 | 7/2021 | Long et al. |
| 11,301,460 | B2 | 4/2022 | Rich et al. |
| 11,521,200 | B1 | 12/2022 | Khan |
| 11,538,028 | B1 | 12/2022 | Dulub |
| 2006/0282295 | A1* | 12/2006 | McComb ............... G06Q 50/02 705/4 |
| 2020/0250719 | A1* | 8/2020 | Shah .................. G06Q 30/0605 |
| 2020/0385738 | A1* | 12/2020 | Nieto ................. C12N 15/1137 |
| 2021/0390531 | A1 | 12/2021 | Voorhees et al. |
| 2021/0406920 | A1 | 12/2021 | Mclaney |
| 2022/0027992 | A1* | 1/2022 | Blevins ................. H04L 9/3247 |
| 2022/0058630 | A1 | 2/2022 | Yantis et al. |
| 2022/0173893 | A1 | 6/2022 | Basu et al. |
| 2022/0229883 | A1 | 7/2022 | Khandelwal et al. |
| 2022/0270084 | A1 | 8/2022 | Xue et al. |
| 2022/0351186 | A1 | 11/2022 | Quigley et al. |
| 2022/0351195 | A1 | 11/2022 | Quigley et al. |
| 2022/0366022 | A1 | 11/2022 | Goldston et al. |
| 2022/0366061 | A1 | 11/2022 | Spivack et al. |

(Continued)

Primary Examiner — Abu S Sholeman
(74) Attorney, Agent, or Firm — Moore & Van Allen PLLC; Andrew T. Wood

(57) ABSTRACT

Embodiments of the invention are directed to systems, computer program products, and methods for assigning geospatial data to tokenized resources via a bridge protocol. The present invention is structured to electronically receive, over a distributed network, a request for a token for a resource. Thereafter, a token generator is initiated and the token is generated, wherein the token comprises resource information and the token is published on a marketplace. Resource information is transmitted to or from the token via a bridge, the resource information comprising geo-spatial data from a geo-spatial analyzer. Thereafter, a consensus is obtained, and the token is recorded on a distributed network.

17 Claims, 4 Drawing Sheets

(56) References Cited

U.S. PATENT DOCUMENTS

| | | |
|---|---|---|
| 2022/0366486 A1 | 11/2022 | Mccoy et al. |
| 2022/0374503 A1 | 11/2022 | Goldston et al. |
| 2022/0383303 A1 | 12/2022 | Mullen et al. |
| 2022/0392176 A1 | 12/2022 | Malik et al. |
| 2023/0018175 A1* | 1/2023 | Kaplan .............. G06Q 20/3829 |
| 2023/0385738 A1* | 11/2023 | Lobell ................ G06Q 10/0637 |

* cited by examiner

SYSTEM AND METHOD OF ASSIGNING GEOSPATIAL DATA TO TOKENIZED RESOURCES VIA A BRIDGE PROTOCOL

FIELD OF THE INVENTION

The present invention embraces a system and method of assigning geospatial data to tokenized resources via a bridge protocol.

BACKGROUND

With the ongoing digitalization of the world, tokens are becoming a very viable solution for tokenizing ownership of resources representing property, indemnity policies, obligations, contracts, or the like. Resources often require attention from entities as a result of calamities. As users engage in online marketplaces for such resources, there is a need for a system and method of assigning geospatial data to tokenized resources via a bridge protocol.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for assigning geospatial data to tokenized resources via a bridge protocol. The system comprising: at least one non-transitory storage device, and at least one processing device coupled to the at least one non-transitory storage device, wherein the at least one processing device is configured to: electronically receive, over a distributed network from a computing device of a user, a request for a token for a resource, wherein the resource is at least one of: a holding, an obligation, and an indemnity policy, initiate a token generator in response to receiving the request from a user or an entity, generate the token using the token generator, wherein the token comprises resource information, and wherein the token is structured to be programmed, publish the token on a marketplace, wherein the marketplace allows users to access the token, transmit the resource information to or from the token via a bridge, the resource information comprising geo-spatial data from a geo-spatial analyzer, obtain a consensus, and record the token on a distributed ledger.

In some embodiments, wherein in response to receiving geo-spatial data from the geo-spatial analyzer, the bridge modifies the resource information.

In some embodiments, wherein the at least one processing device is further configured to: receive a request for a disposition of a claim comprising event data, automatically generate a validation as a result of comparing the event data to the geo-spatial data from the geo-spatial analyzer determine related claims by comparing the claim to the geo-spatial data, and provide a disposition of a plurality of claims to a plurality of tokens via the resource information transmitted from the bridge.

In some embodiments, wherein the geo-spatial analyzer comprises a machine learning model.

In some embodiments, wherein in response to receiving geo-spatial data from the geo-spatial analyzer, the bridge sends an alert to auto-trigger an event.

In some embodiments, wherein obtaining the consensus is conducted in an off-chain transfer.

In some embodiments, wherein obtaining the consensus is conducted in an on-chain transfer.

In another aspect, a computer program product for assigning geospatial data to tokenized resources via a bridge protocol is presented. The computer program product comprising a non-transitory computer-readable medium comprising code causing a first apparatus to: electronically receive, over a distributed network from a computing device of a user, a request for a token for a resource, wherein the resource is at least one of: a holding, an obligation, and an indemnity policy, initiate a token generator in response to receiving the request from a user or an entity, generate the token using the token generator, wherein the token comprises resource information, and wherein the token is structured to be programmed, publish the token on a marketplace, wherein the marketplace allows users to access the token, transmit the resource information to or from the token via a bridge, the resource information comprising geo-spatial data from a geo-spatial analyzer, obtain a consensus; and record the token on a distributed ledger.

In yet another aspect, a method for assigning geospatial data to tokenized resources via a bridge protocol is presented. The method comprising: electronically receiving, over a distributed network from a computing device of a user, a request for a token for a resource, wherein the resource is at least one of: a holding, an obligation, and an indemnity policy, initiating a token generator in response to receiving the request from a user or an entity, generating the token using the token generator, wherein the token comprises resource information, and wherein the token is structured to be programmed, publishing the token on a marketplace, wherein the marketplace allows users to access the token, transmitting the resource information to or from the token via a bridge, the resource information comprising geo-spatial data from a geo-spatial analyzer, obtaining a consensus, and recording the token on a distributed ledger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
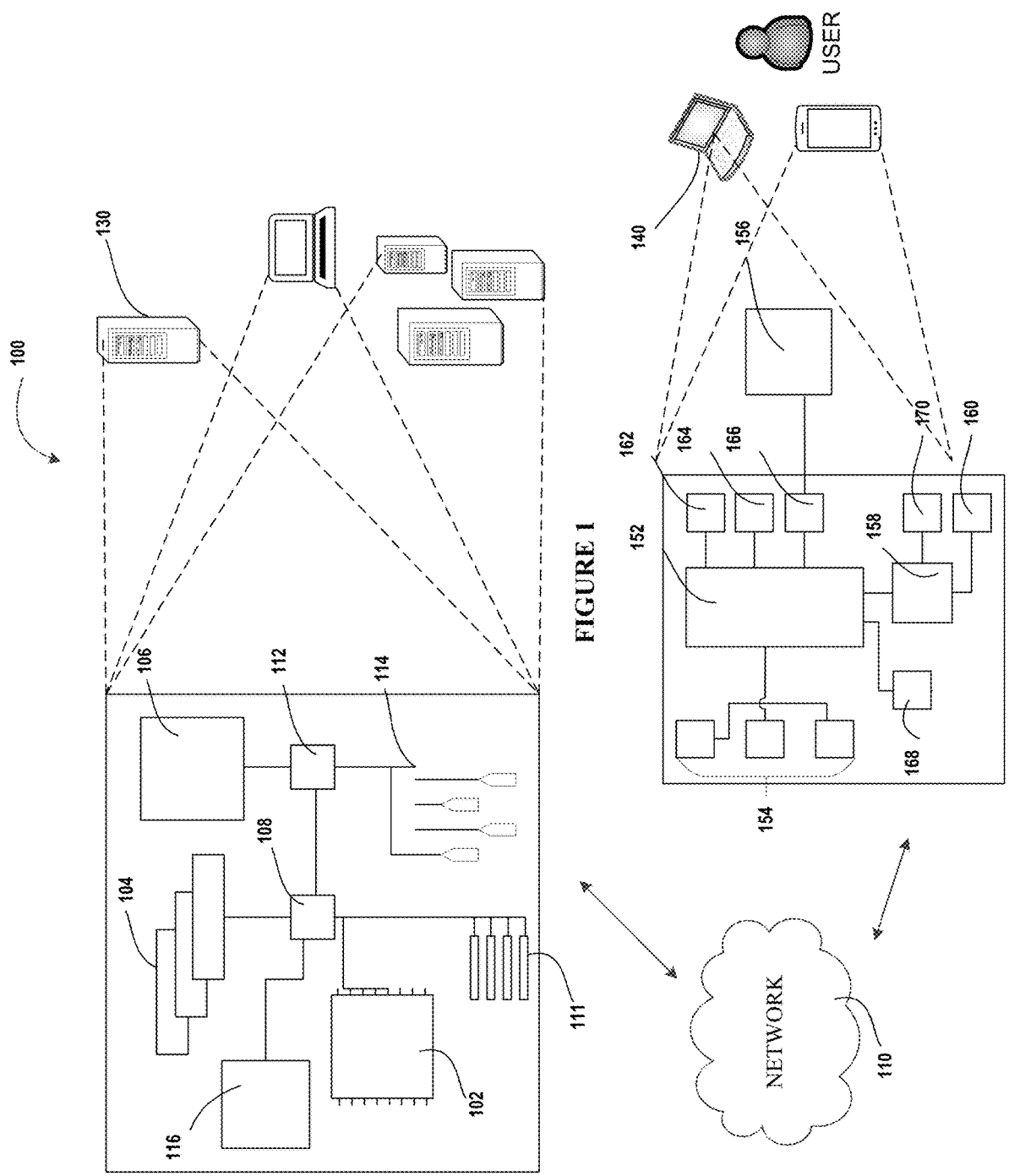
Figure 2A:
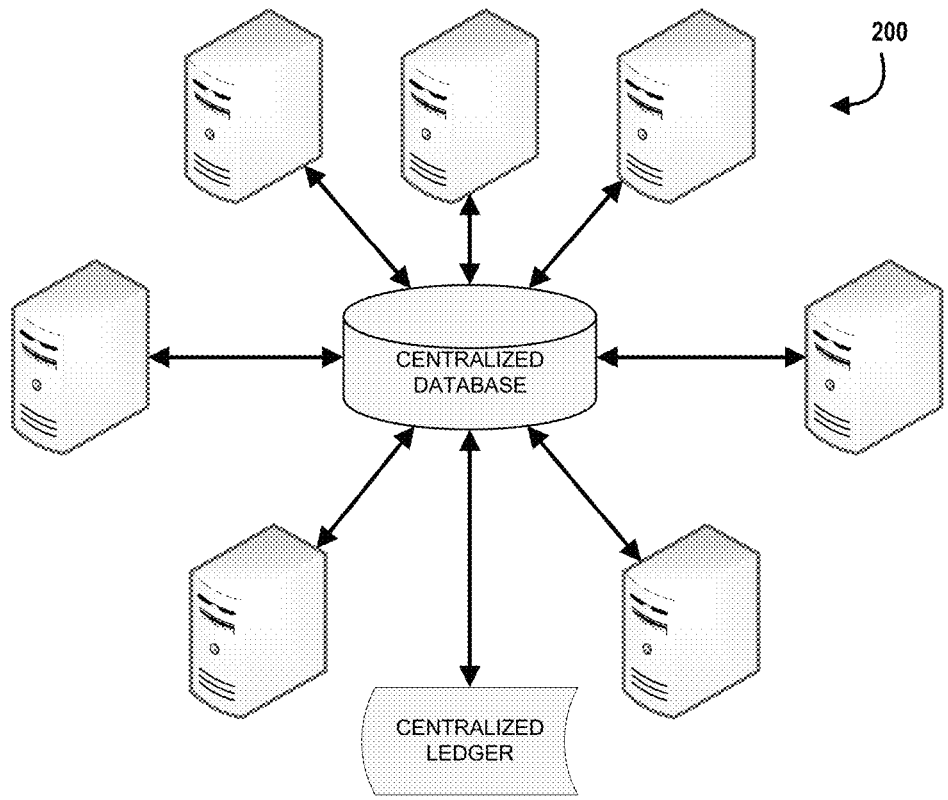
Figure 2B:
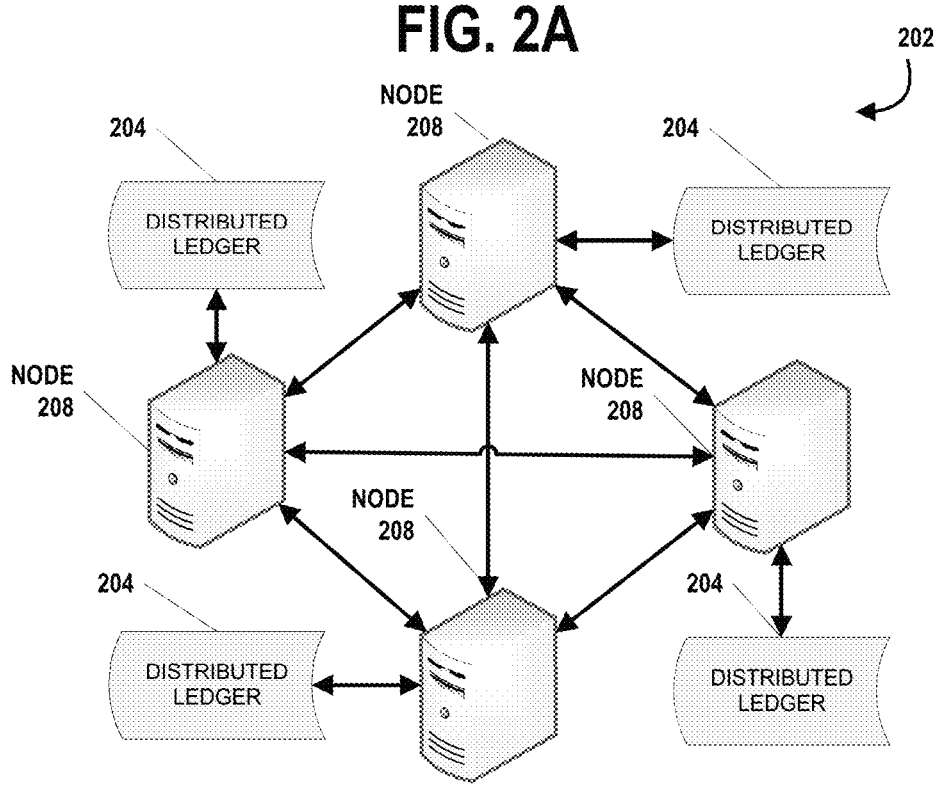
Figure 3:
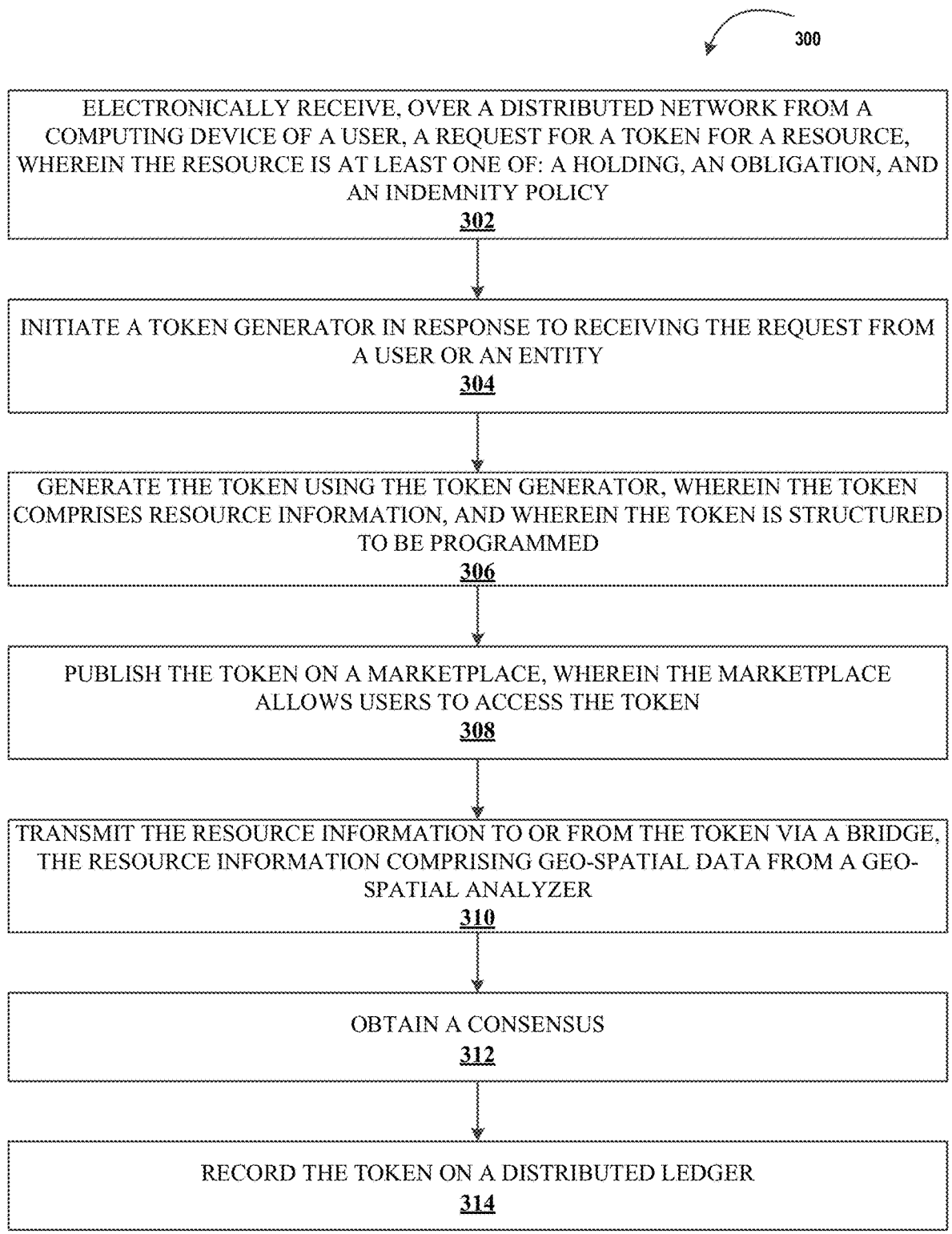
Figure 4:
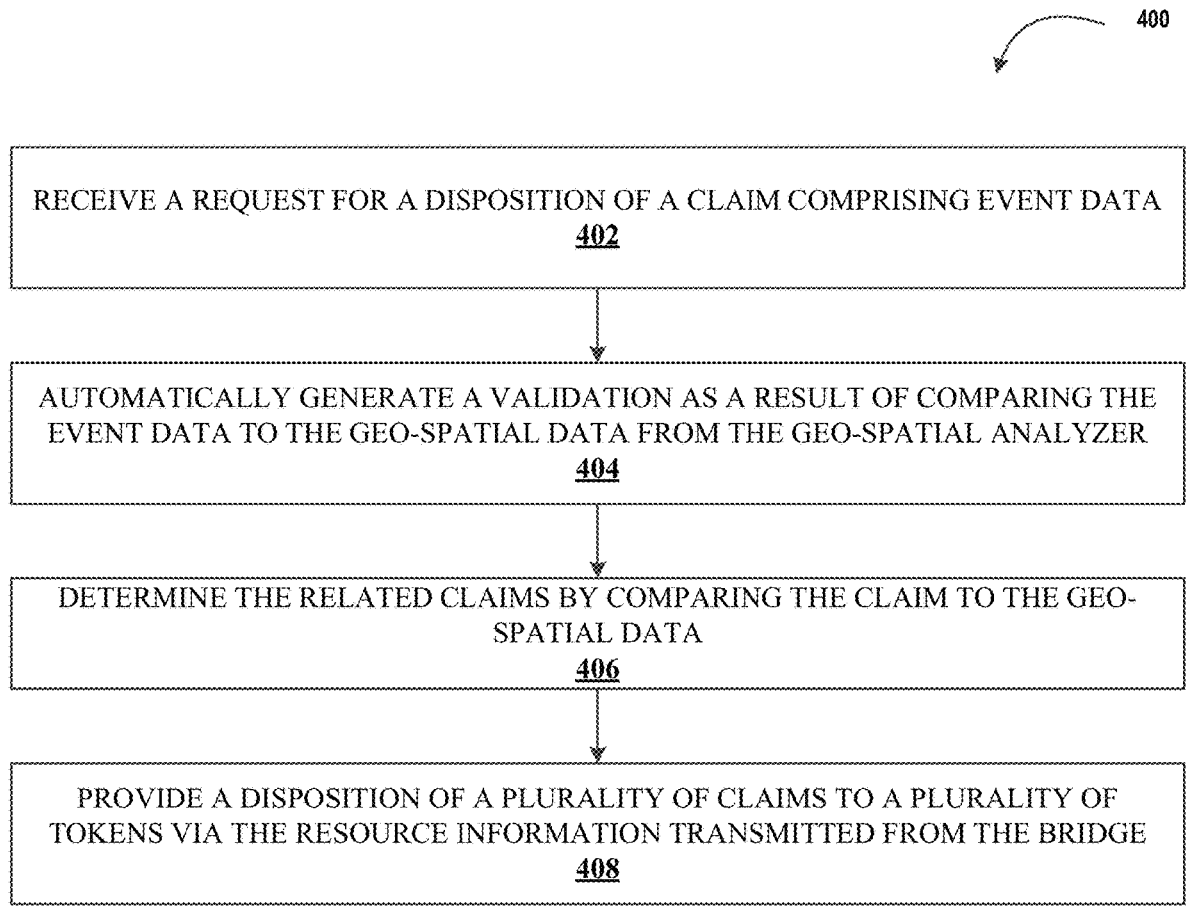

Having thus described embodiments of the invention in general terms, reference will now be made the accompanying drawings, wherein:

FIG. 1 illustrates technical components of a system for assigning geospatial data to tokenized resources via a bridge protocol, in accordance with an embodiment of the invention;

FIG. 2A illustrates a centralized database architecture environment, in accordance with one embodiment of the invention;

FIG. 2B illustrates a general distributed network system environment architecture, in accordance with one embodiment of the present invention;

FIG. 3 illustrates a process flow for assigning geospatial data to tokenized resources via a bridge protocol, in accordance with an embodiment of the invention;

FIG. 4 illustrates a process flow for disposition of claims using resource information from a geo-spatial analyzer via a bridge protocol 400, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

The term "distributed ledger" as used herein, refers to a decentralized electronic ledger of blocks which are authenticated by a federated consensus protocol, a copy of which is stored on multiple nodes of the distributed network. Multiple computer systems within the distributed network each comprise a copy of the entire ledger of records. Embodiments of the invention as described herein may utilize one, several, or a combination (i.e. hybrid) of a number of different consensus algorithms to ensure the integrity of the distributed ledger within the block chain. In some embodiments, the consensus mechanism may be a "proof of work" ("PoW") protocol, in which the nodes perform a series of calculations to solve a cryptographic puzzle. In other embodiments, the consensus mechanism may be a "proof of stake" ("PoS") protocol or delegated proof of stake protocol. Other examples of consensus mechanisms which may be utilized, as understood by one of ordinary skill in the art, are proof of capacity ("PoC"), proof of activity ("PoA"), proof of burn ("PoB"), proof of elapsed time ("PoET"), or the like. For instance, in order to validate a pending data record, the nodes may be required to calculate a hash via a hash algorithm (e.g. SHA256, SHA3-256, SHA-3, SHA3-512, Keccak-256, or the like) which satisfies certain conditions set by the system. Calculating a hash in this way may be referred to herein as "mining," and thus a node performing the mining may be referred to as "miners" or "miner nodes."

As used herein, a "resource" may generally refer to a contract or documentation representative of a holding, indemnity policy, obligation, or the like. For example, in one embodiment of the invention, a resource may be represented as a token. For purposes of this invention, a resource is typically stored as a token, which also may referred to colloquially as a "smart contract." Such resources may be stored in a distributed ledger maintained on a distributed network. Such resources may be organized, stored and retrieved electronically using a computing device.

As used herein, "resource information" may refer to any data comprising a resource, such as user biographic information, financial information regarding the resource such as policy amount, holding amount, premium amount, or interest rate. The resource information may also comprise a list of claims to occurrences which have impacted the resource, such as a request for reimbursement. As such, the resource information may include an indicator of whether or not the claim has been authenticated by the entity.

As used herein, a "geo-spatial analyzer" may refer to a system which receives information regarding an existing token, such as the geographic location, or geographic location of interest associated with the token, and thereafter works in conjunction with geo-spatial data such as global positioning systems ("GPS"), weather data such as forecasts, weather maps, weather history, or other systems which compile and list meteorological event predictions and occurrences. The geo-spatial analyzer may then use the geo-spatial data from meteorological event predictions and occurrences of calamities to automatically change underlying data (e.g., resource information) within one or more tokens. In other embodiments, the geo-spatial analyzer may simply provide geo-spatial data to a user associated with the entity regarding such meteorological event predictions and occurrences, and in this way the user associated with the entity may manually change the resource information within one or more tokens. In yet additional embodiments, the geo-spatial analyzer may provide indicators that trigger an alarm or alert to users associated with an entity such that further investigation and/or decisions regarding changing of resource information in one or more tokens may be made by such users. In some embodiments, the geo-spatial analyzer comprises a machine learning model, such that the machine learning model in the geo-spatial analyzer uses historical geo-spatial data from past outputs as inputs to predict new output values. Using a bridge, this information for each token is communicated back to the distributed ledger on which the token is stored.

As used herein, a "calamity" may refer to any natural or manmade event as a result of unexpected, unusual, or otherwise unforeseen weather, climate, geological conditions. Examples include hurricanes, typhoons, tornadoes, sea-level rise, flooding, windstorms, dust storms, volcanic activity, heatwaves or cold spells, blizzards, mudslides, earthquakes, crop infestations, wildfires, or any other event which may be captured and recorded on a graphical map which has an impact on human or animal populations, property, or business volatility.

As used herein, a "bridge" may refer to a standalone computer system (e.g., a computer, terminal, or server) whose primary function is to connect two systems such as two distributed ledger systems, distributed network systems, or the like. Bridges may be custodial (e.g., centralized or trusted) or noncustodial (e.g., decentralized or trustless). In the present system, the bridge is structured to act as an intermediary between the geo-spatial analyzer and the distributed ledger and/or the tokens thereon. The bridge receives resource information from each token such as the identification of the token and any geolocation information stored in the token and communicates such information to the geo-spatial analyzer. The bridge then receives the output of the geo-spatial analyzer such as an event which has occurred or may occur in the future, the likelihood thereof, or other changes to the resource information, and presents this information such as sending triggers or alarms to the entity and/or user associated with the entity when certain threshold criteria are met based on the metrics.

As used herein, a "metric" may refer to the statistical probability at which an instance of a calamity may happen. The metric is generated by the geo-spatial analyzer for any particular geographic position available, and may be generated for calamities such as lightning, hurricanes, thunderstorms, flooding, or the like. For example, a metric associated with the chance that it may rain in a certain location on any given day may be provided as a percentage, such as between 0% and 100%. For a calamity which has already occurred, the metric provided by the geo-spatial analyzer may be 100%, denoting 100% confidence of such occurrence. Metric may be provided quantitatively as percentages, integers, or decimals, or in some embodiments the metric comprises a qualitative and/or descriptive scale ranging from "low" to "medium" to "high". The metric may be provided to the entity, or users who are considering purchasing a resource, to provide a rating of the amount of financial responsibility or inherent precariousness one would assume with possession of the resource. For example, in some occurrences the metric may be low when an occurrence or prediction level is low when associated with a meteorological or geographical event in the geographical area. Similarly, in some occurrences the metric may be high when an occurrence or prediction level is high when associated with a meteorological or geographical event in the geographical area.

As used herein, an "on-chain transfer" may refer to transactions which involve a plurality of nodes in a distributed network verifying each transaction or change to the resource on the distributed ledger. The details of each transaction are published on the distributed ledger such that they cannot be deleted or reversed without obtaining a consensus.

As used herein, an "off-chain transfer" may refer to transactions which involve three parties, two of whom agree about the transaction or change to the resource on the distributed ledger, and a third who verifies the transaction or change to the resource on the distributed ledger. Compared to on-chain transfers, off-chain transfers are faster and may require fewer resources to complete.

FIG. 1 presents an exemplary block diagram of the system environment for assigning geospatial data to tokenized resources via a bridge protocol 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user device 140. In some embodiments, the system 130, and the user device 140 may be used to implement the processes described herein, in accordance with an embodiment of the present invention. In this regard, the system 130 and/or the user device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, electronic kiosk devices, blade servers, mainframes, or any combination of the aforementioned. In accordance with embodiments of the invention, the user device 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low-speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the entity. The system 130 may be located at the facility associated with the entity or remotely from the facility associated with the entity.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user device 140, in accordance with an embodiment of the invention. The user device 140 includes a processor 152, memory 154, an input/output device such as a display 156, a communication interface 158, and a transceiver 160, among other components. The user device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user device 140, including instructions stored in the memory 154. The processor may be implemented as a chipset of chips that include separate and multiple analog and digital processors. The processor may be configured to provide, for example, for coordination of the other components of the user device 140, such as control of user interfaces, applications run by user device 140, and wireless communication by user device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user device 140 with other devices. External interface 168 may provide, for example, for wired communication in some implementations, or for wireless communication in other implementations, and multiple interfaces may also be used.

The memory 154 stores information within the user device 140. The memory 154 can be implemented as one or more of a computer-readable medium or media, a volatile memory unit or units, or a non-volatile memory unit or units. Expansion memory may also be provided and connected to user device 140 through an expansion interface (not shown), which may include, for example, a SIMM (Single In Line Memory Module) card interface. Such expansion memory may provide extra storage space for user device 140 or may also store applications or other information therein. In some embodiments, expansion memory may include instructions to carry out or supplement the processes described above and may include secure information also. For example, expansion memory may be provided as a security module for user device 140 and may be programmed with instructions that permit secure use of user device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user device 140 to transmit and/or receive information or commands to and from the system 130 via the network 110. Any communication between the system 130 and the user device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user device 140 (or any other computing devices) may provide the system 130 with permissioned to access the protected resources of the user device 140 (or any other computing devices), which may include a GPS device, an image capturing component (e.g., camera), a microphone, a speaker, and/or any of the components described herein.

The user device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user device 140, which may be used as appropriate by applications running thereon, and in some embodiments, one or more applications operating on the system 130.

The user device 140 may also communicate audibly using audio codec 162, which may receive spoken information from a user and convert it to usable digital information. Audio codec 162 may likewise generate audible sound for a user, such as through a speaker, e.g., in a handset of user device 140. Such sound may include sound from voice telephone calls, may include recorded sound (e.g., voice messages, music files, etc.) and may also include sound generated by one or more applications operating on the user device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user device 140 may have a client-server relationship, where the user device 130 makes a service request to the system 130, the system 130 accepts the service request, processes the service request, and returns the requested information to the user device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2A illustrates a centralized database architecture environment 200, in accordance with one embodiment of the present invention. The centralized database architecture comprises multiple nodes from one or more sources that converge into a centralized database. The system, in this embodiment, may generate a single centralized ledger for contracts or data received from the various nodes.

FIG. 2B provides a general distributed network system environment architecture 202, in accordance with one embodiment of the present invention. Rather than utilizing a centralized database of data for storing contracts, as discussed above in FIG. 2A, various embodiments of the invention may use a decentralized distributed network configuration or architecture utilizing a distributed network system to store "smart contracts" as tokens in a distributed ledger as shown in FIG. 2B.

A distributed ledger is a distributed database, distributed across a distributed network, that maintains a list of data blocks. Data blocks may comprise tokens containing information or data regarding loans, contracts, stock holdings, or the like, the security of which is enhanced by the distributed nature of the distributed network. A distributed network system typically includes several nodes, which may be one or more systems, machines, computers, databases, data stores or the like operably connected with one another. In some cases, each of the nodes or multiple nodes are maintained by different entities. A distributed network typically works without a central repository or single administrator. One well-known application of a distributed network is the public ledger of resource transfers for cryptocurrencies. Another application of a distributed network system as will be discussed herein is for use in storing tokens. The data blocks recorded in the distributed network are enforced cryptographically and stored on the nodes of the distributed network.

A distributed network provides numerous advantages over traditional databases. A large number of nodes of a distributed network may reach a consensus regarding the validity of ownership of a token, that certain criteria or conditions have been met subject to the resource information held within the token, and so forth.

As mentioned above and referring to FIG. 2B, a distributed network system 202 is typically decentralized-meaning that a distributed ledger 204 is maintained on multiple nodes 208 of the distributed network 202. One node in the distributed network may comprise a complete or partial copy of the entire ledger, set of ledgers, or tokens and/or blocks recorded on the distributed ledger. Token generation is initiated at a node of a distributed network and communicated to the various nodes of the distributed network. Miner nodes may validate a token, add the token or block comprising multiple tokens to its copy of the distributed ledger, and/or broadcast the token, its validation, and/or other data to other nodes or miner. This other data may include time-stamping, such as is used in some distributed ledgers.

FIG. 3 illustrates a process flow for assigning geospatial data to tokenized resources via a bridge protocol 300, in accordance with an embodiment of the invention. As shown in block 302, the system is structured to electronically receive, over a distributed networks from a computing device of a user, a request for a token for a resource, wherein the resource is at least one of: a holding, an obligation, and an indemnity policy.

Entities may offer, facilitate, authorize, or otherwise record many different resources for users. Some of these resources may be holdings, such as a user's equity in a particular entity (e.g., shares), or the like. Recordkeeping of ownership of such holdings are important to be verified in authenticity, such that at any point in time it is known who is in possession of the holdings. Similarly, other such products may be obligations (e.g., loans) which represent funds supplied to a customer of an entity in exchange for a promise to return such funds, often within a predetermined time period, and often with additional funds provided by the customer in exchange for the service provided by the entity. Finally, indemnity policies (e.g., insurance policies) may be held by customers of an entity as a means to ensure fund coverage for an underlying possession, life, responsibility, or the like in the event that damage occurs to an underlying possession, life, or responsibility. In this way, if the underlying possession, life, or responsibility sustains damage or otherwise is in need of replacement, repair, attention, or otherwise, the entity will provide the user with funds for such purposes when the user makes a "claim," in exchange for funds paid to the entity in regular installments before and/or after the occurrence (e.g., premiums). As such, and as illustrated in block 302, the system may receive a request for a token for one of the aforementioned resources.

Such resources are historically recorded electronically and secured in a singular location, such as a centralized database. However, storage of the records documenting these resources benefit greatly from being stored as tokens on a distributed network, such that ownership is able to be verified by multiple nodes across the distributed network, any changes thereto are tracked and recorded by the nodes reaching a consensus, and so forth. Such use of these "smart contracts" as tokens may occasionally require updating of underlying resource information, such as interest rate changes, verification of a claim for an indemnity policy (e.g., ensuring that the purposes of the claim are as a result of a legitimate need), changing of names or surnames on resource ownership, and the like. Typically, such updates involve manual processing of the resource information by a user. This can become cumbersome and inefficient in scenarios where the resource information within multiple tokens is likely to be changed as a result of a singular event. One example of this as it relates to the present invention is a calamity. In the timeframe following a calamity, multiple claims for a plurality of indemnity policies may be filed within a short time window. For example, a tornado may impact a particular neighborhood, and all homeowners whose houses sustained damage as a result of the tornado may submit claims on their indemnity policies at roughly the same time.

Prior to the present invention, each claim would need to be researched, and the occurrence of a calamity may need to be independently verified for each of the claims. In the present invention, a geo-spatial analyzer may autonomously recognize that a calamity has occurred, and as a result automatically validate, or verify, the plurality of claims as being authentic. In some embodiments, such validation may occur preemptively, prior to users who hold the indemnity policies reaching out to the entity as a result of damage.

In other embodiments, when a plurality of new tokens are constructed as a result of new contracts for resources to which users have agreed, the system may be structured to use the geo-spatial analyzer to autonomously determine properties or characteristics surrounding the underlying property for the resource. For example, the geo-spatial analyzer may recognize that one or more tokens are associated with indemnity policies for houses within a flood plain, as defined by flood plain geo-spatial data within the geo-spatial analyzer. As such, the geospatial analyzer may communicate with the entity that increased premiums are required, or an increased interest rate, or the like. In some embodiments, changes to such premiums or interest rates may occur autonomously and not require the intervention of users associated with the entity.

Next, as shown in block 304, the process flow includes initiating a token generator in response to receiving the request from a user or an entity. Prior to this point in the process, a token comprising a smart contract has not yet been generated, or "minted". The generation of the token takes the underlying data, or otherwise referred to herein as "resource information" and converts it to a digital possession for storage on the distributed ledger. The distributed ledger to which the token may be generated may be any number of platforms, such as Ethereum, Binance, Tros, EOS, or the like. In some embodiments, a private distributed ledger of proprietary construction is implemented for use with the present tokens.

Next, as shown in block 306, the token is generated using the token generator, wherein the token comprises resource information, and wherein the token is structured to be programmed. This process step involves the execution of the request for token generation as described in block 304. The token generator may use processing power from the processing device of one or more systems 130 along network 110 in order to facilitate the generation using the generator. It shall also be noted that the token is structured to be programmed, such that, unlike many tokens commonly generated, alteration or modification of the underlying resource information within the token may occur. The token is presented to the token generator with some of the resource information already applied as a part of the request process illustrated in block 302. Further modification or alteration of the token occurs later in the process as a result of receiving resource information from the geo-spatial analyzer, as will be discussed in greater detail provided herein.

Next, as shown in block 308, the process flow includes publishing the token on a marketplace, wherein the marketplace allows users to access the token. For such smart contract tokens to be available to users for users to enter into the resources to which the token represents, the tokens are placed in the marketplace. The tokens may be placed into the marketplace by user, users associated with an entity, or autonomously by the entity. The marketplace may allow purchasing or selling of tokens between users or allow entities to agree or decline to engage in the contract or resource represented by the token if the token has been placed in the marketplace under conditions which the entity is unable to satisfy. For example, a user may request a token to be generated and placed in the marketplace for a specific monetary amount that is not feasible for an entity to agree to. The marketplace also serves as a location on which tokens owned by users, or engaged in by users (e.g., such as those who enter into a holding, obligation, or indemnity product) may be stored.

Next, as shown in block 310, the process flow includes transmitting the resource information to or from the token via a bridge, the resource information comprising geo-spatial data from a geo-spatial analyzer. Typically, information such as resource information is unable to be communicated directly with tokens or other digital possessions on a distributed ledger. As described herein, a bridge is utilized in the present invention to communicate to and from the tokens on the distributed ledger. The information which will be communicated comprises resource information obtained from a geo-spatial analyzer. As previously described, the geo-spatial analyzer is an application executed on a processing device of at least one of the system 130 or in some embodiments the user device 140. The geo-spatial analyzer contains real-time information monitoring associated with weather, geolocation, and other natural occurrences such as sea level, volcanic activity, traffic patterns, cloud coverage, climate trends, or the like. Such geo-spatial data gathered during information monitoring may be used as resource information data within a token. In this way, the geo-spatial analyzer is configured to output or receive resource information. For example, the geo-spatial analyzer may receive geographic, or GPS coordinates associated with one or more tokens as resource information and use this resource information to compare the geographic or GPS data to the real-time information within the geo-spatial analyzer to determine any calamity concerns associated with the one or more tokens. Similarly, the geo-spatial analyzer may proactively output such calamity concerns associated with a particular geographic region to the tokens existing in the marketplace, such that the resource information within the tokens in the marketplace is modified or altered preemptively as a result of a calamity identified by the geo-spatial analyzer.

As previously described, the geo-spatial analyzer is unable to communicate directly with the tokens, and as such a bridge is provided and is utilized by the system. The bridge is positioned between the marketplace with tokens and the geo-spatial analyzer, such that the bridge receives tokens and communicates portions of the resource information from the token to the geo-spatial analyzer, such as the token identifier and geolocation. Once the geo-spatial analyzer has identified any events in the weather monitoring system or other calamities and indicators as previously described, the bridge is then configured to communicate the resource information such as the event details, probability of occurrence, verification of occurrence of the calamity, or the like, to the token via the bridge.

In some embodiments, the geo-spatial analyzer is configured to continuously scan and analyze the geo-spatial data within the geo-spatial analyzer such that when the geospatial analyzer recognized a potential calamity, or an actual calamity, the geo-spatial analyzer sends an alert to the marketplace or the entity. In this way, the alert may be used to automatically trigger events such as adjusting rates or levels of resources for obligations, adjusting premiums for indemnity policies, and so forth. The aforementioned reactions to the alerts may be implemented automatically, such that no human intervention is required. Alternatively, the alerts may be provided to a user associated with an entity for informational purposes and thereafter allow the user associated with the entity to make adjustments manually.

In some embodiments, the decisions made by the geo-spatial analyzer are made using a machine learning model embedded in the geo-spatial analyzer, such that the geo-spatial analyzer, over time, learns to make more accurate decisions as a result of supervised or unsupervised learning. In this way, the aforementioned alerts may become more accurate as to the impact of the alerts on the tokens based on the geo-spatial data within the tokens. In doing so, false alerts which do not impact certain types of tokens or tokens which have other geographic data outside the scope of the calamity determined by the geo-spatial analyzer may be ignored. Or in some scenarios, the priority level of the alert may be escalated if the machine learning model determines that the impact of a calamity is certain. This machine learning model may also, in some embodiments, be configured to provide more accurate targeting of related claims for disposition, as will be discussed with respect to FIG. 4.

Next, as shown in block 312, the process flow includes obtaining a consensus. Any alterations or modification which occur to a token on a distributed ledger, such as that which is performed by the geo-spatial analyzer via the bridge, must be authenticated by obtaining a consensus. The consensus may refer to any number of methods or practices used to achieve trust, agreement, and security throughout a distributed network. These are typically proof-of-work (PoW) or proof-of-stake (PoS) mechanisms but may also employ other viable alternatives such as proof of capacity (PoC), proof of activity (PoA), proof of burn (PoB), proof of elapsed time (PoET), or the like, as previously described herein.

The consensus and subsequent recordation of the token on the distributed ledger may be accomplished as a result of an on-chain transfer or an off-chain transfer. As previously described, an on-chain transfer involves a plurality of nodes in the distributed network verifying each transaction. The details of each transaction are published on the distributed ledger such that they cannot be deleted or reversed without obtaining a consensus. An off-chain transfer may refer to transactions which involve three parties, two of whom agree about the transaction, and a third who verifies the transaction.

Next as shown in block 314, the process flow includes recording the token on a distributed ledger. As described the token may have previously been stored on a distributed ledger in the marketplace. Or in some embodiments, the token may have been initiated in the marketplace but not yet placed on the distributed ledger prior to receiving the resource information from the geo-spatial analyzer. In any case, after a consensus is reached in block 312, the token comprising amended, modified, or altered resource information is recorded onto the distributed ledger and as such each of the nodes comprises a record of such distributed ledger with ownership of the token thereon.

FIG. 4 illustrates a process flow for disposition of claims using resource information from a geo-spatial analyzer via a bridge protocol 400, in accordance with an embodiment of the invention. As previously described, the system described herein may be implemented to address a calamity or climate-related events as identified by the geo-spatial analyzer. Users who are customers and hold tokens related to a particular geographic area may all be impacted simultaneously or within a close timeframe to one another as a result of such events. By recognizing the occurrence of an event, an entity may leverage this knowledge to preemptively or automatically resolve claims made by customers pertaining to policies such as indemnity policies, holdings, or obligations. For example, a calamity such as a hurricane may impact several customers and require indemnity policy claims to be approved for disbursement of resources. In this way, a group of indemnity policies within a known geographic location may be approved without unnecessary human investigation or intervention. Similarly, a monthly or regularly scheduled resource transfer from a customer to an entity as a result of an obligation to the entity may be subjected to delays as a result of the aforementioned event or natural disaster. As such, the entity may preemptively allow for a grace period for the regularly scheduled resource transfer to occur after a due date without consequence, for a particular group of obligations pertaining geographically to the area.

As shown in block 402, the process flow includes receiving a request for a disposition of a claim comprising event data. Event data may be resource information structured to provide the system with details of an underlying event. For example, a user in making a claim may note that "my house has been hit by a storm." The machine learning model in the geo-spatial analyzer may interpret this information and thereafter search for related claims. In some embodiments, the geo-spatial analyzer may be configured to send alerts or notices of an impacted geographic area prior to receiving a request from a user for a disposition of a claim. In other embodiments, such as illustrated by block 402, the system may be alerted to a potential calamity as a result of a user filing a request for a disposition of a claim. The system receives a request for disposition and then subsequently transmits the resource information within the token associated with the request for disposition via the bridge to the geo-spatial analyzer.

Next, as shown in block 404, the process flow includes automatically generating a validation as a result of comparing the event data to the geo-spatial data from the geo-spatial analyzer. After the geo-spatial analyzer receives the resource information associated with the claim via the bridge, the geo-spatial analyzer then extracts the geolocation from the resource information. This geolocation is then used within the geo-spatial analyzer to compare to the information gathered regarding calamities. The geo-spatial analyzer is structured to position the GPS coordinates from the geolocation onto a map within the geo-spatial analyzer, and subsequently compare within the geo-spatial analyzer any occurrence regarding calamities within a user-specified timeframe and a user-specified geographic area. If such a calamity is found within the timeframe and area, then a validation is automatically generated for the claim provided by the token.

Next, as shown in block 406, the process flow includes determining related claims by comparing the claim to the geo-spatial data. In block 404, the system has received and validated the occurrence of a geographic event as it pertains to one claim. Since the geo-spatial analyzer is in communication with the marketplace, the geo-spatial analyzer is configured to make a determination of any other claims which may be affected by the geographic event. A group of such claims is determined, and thereinafter marked or flagged for disposition.

Next, as shown in block 408, the process flow includes providing a disposition of a plurality of claims to a plurality of tokens via the resource information transmitted from the bridge. A disposition of a claim may comprise approval, rejection, or an intermediary disposition which prompts a user associated with the entity to provide approval manually. Once the claims have been marked or flagged for disposition, the system may preemptively reach a disposition of such claims, or provide a conditional disposition based on factors such as resource amount and timeframe before the approval expires. In this way, any subsequent user who accesses the entity to file a claim will be met with automatic approval of the claim thereafter. Alternatively, some embodiments of the system may be used for batch processing of claims which enter the system at different times but are all awaiting disposition by the system.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for assigning geospatial data to tokenized resources via a bridge protocol, the system comprising:
    at least one non-transitory storage device; and
    at least one processing device coupled to the at least one non-transitory storage device,
    wherein the at least one processing device is configured to:
      electronically receive, over a distributed network from a computing device of a user, a request for a token for a resource, wherein the resource comprises an indemnity policy for an underlying physical asset;
      generate the token using a token generator, wherein the token comprises resource information comprising geolocation information of the underlying physical asset and dynamically linked calamity likelihood and severity metrics computed by the geo-spatial analyzer;
      publish the token on a marketplace, wherein the marketplace allows users to access the token;
      transmit the resource information to or from the token via a bridge from a geo-spatial analyzer, the resource information comprising geo-spatial data of at least one calamity associated with the indemnity policy;
      obtain a consensus;
      record the token on a distributed ledger;
      receive a request for a disposition of a claim on the indemnity policy, the request for the disposition of the claim comprising event data of the claim;
      automatically generate a validation as a result of comparing the event data to the geo-spatial data from the geo-spatial analyzer;
      determine related claims by comparing the claim to the geo-spatial data;
      group the related claims into grouped claims based on the geo-spatial data, wherein the grouping is based on the geo-spatial data;
      provide a disposition of a plurality of the grouped claims to a plurality of tokens, based on the validation, via the resource information transmitted from the bridge; and
      adjust, automatically via the geo-spatial analyzer and transmitted via the bridge, terms of the indemnity policy represented by the token, the terms comprising coverage premiums.

2. The system of claim 1, wherein in response to receiving geo-spatial data from the geo-spatial analyzer, the bridge modifies the resource information.

3. The system of claim 1, wherein the geo-spatial analyzer comprises a machine learning model.

4. The system of claim 2, wherein in response to receiving geo-spatial data from the geo-spatial analyzer, the bridge sends an alert to auto-trigger an event.

5. The system of claim 1, wherein obtaining the consensus is conducted in an off-chain transfer.

6. The system of claim 1, wherein obtaining the consensus is conducted in an on-chain transfer.

7. A computer program product for assigning geospatial data to tokenized resources via a bridge protocol, the computer program product comprising a non-transitory computer-readable medium comprising code causing a first apparatus to:
    electronically receive, over a distributed network from a computing device of a user, a request for a token for a resource, wherein the resource comprises an indemnity policy for an underlying physical asset;
    generate the token using a token generator, wherein the token comprises resource information comprising geolocation information of the underlying physical asset and dynamically linked calamity likelihood and severity metrics computed by the geo-spatial analyzer;
    publish the token on a marketplace, wherein the marketplace allows users to access the token;
    transmit the resource information to or from the token via a bridge from a geo-spatial analyzer, the resource information comprising geo-spatial data, of at least one calamity associated with the indemnity policy, from a geo-spatial analyzer;
    obtain a consensus;
    record the token on a distributed ledger;
    receive a request for a disposition of a claim on the indemnity policy, the request for the disposition of the claim comprising event data of the claim;
    automatically generate a validation as a result of comparing the event data to the geo-spatial data from the geo-spatial analyzer;
    determine related claims by comparing the claim to the geo-spatial data;
    group the related claims into grouped claims based on the geo-spatial data, wherein the grouping is based on the geo-spatial data;
    provide a disposition of a plurality of the grouped claims to a plurality of tokens via the resource information transmitted from the bridge; and
    adjust, automatically via the geo-spatial analyzer and transmitted via the bridge, terms of the indemnity policy represented by the token, the terms comprising coverage premiums.

8. The computer program product of claim 7, wherein in response to receiving geo-spatial data from the geo-spatial analyzer, the bridge modifies the resource information.

9. The computer program product of claim 7, wherein the geo-spatial analyzer comprises a machine learning model.

10. The computer program product of claim 8, wherein in response to receiving geo-spatial data from the geo-spatial analyzer, the bridge sends an alert to auto-trigger an event.

11. The computer program product of claim 7, wherein obtaining the consensus is conducted in an off-chain transfer.

12. The computer program product of claim 7, wherein obtaining the consensus is conducted in an on-chain transfer.

13. A method for assigning geospatial data to tokenized resources via a bridge protocol, the method comprising:
    electronically receiving, over a distributed network from a computing device of a user, a request for a token for a resource, wherein the resource comprises an indemnity policy for an underlying physical asset;

generating the token using a token generator, wherein the token comprises resource information comprising geo-location information of the underlying physical asset and dynamically linked calamity likelihood and severity metrics computed by the geo-spatial analyzer;

publishing the token on a marketplace, wherein the marketplace allows users to access the token;

transmitting the resource information to or from the token via a bridge from a geo-spatial analyzer, the resource information comprising geo-spatial data, of at least one calamity associated with the indemnity policy, from a geo-spatial analyzer;

obtaining a consensus;

recording the token on a distributed ledger;

receiving a request for a disposition of a claim on the indemnity policy, the request for the disposition of the claim comprising event data of the claim;

automatically generating a validation as a result of comparing the event data to the geo-spatial data from the geo-spatial analyzer;

determining related claims by comparing the claim to the geo-spatial data;

grouping the related claims into grouped claims based on the geo-spatial data, wherein the grouping is based on the geo-spatial data;

providing a disposition of a plurality of the grouped claims to a plurality of tokens via the resource information transmitted from the bridge; and adjusting, automatically via the geo-spatial analyzer and transmitted via the bridge, terms of the indemnity policy represented by the token, the terms comprising coverage premiums.

14. The method of claim 13, wherein in response to receiving geo-spatial data from the geo-spatial analyzer, the bridge modifies the resource information.

15. The method of claim 13, wherein the geo-spatial analyzer comprises a machine learning model.

16. The method of claim 14, wherein in response to receiving geo-spatial data from the geo-spatial analyzer, the bridge sends an alert to auto-trigger an event.

17. The method of claim 13, wherein obtaining the consensus is conducted in an off-chain transfer.

* * * * *